H. PETERSEN.
LOCKING AND RELEASING DEVICE FOR CULTIVATORS.
APPLICATION FILED DEC. 17, 1913.

1,111,920.

Patented Sept. 29, 1914.
2 SHEETS—SHEET 1.

Witnesses
R. R. Bond
E. R. Bond

Inventor,
Henry Petersen,
By E. R. Bond
Attorney

H. PETERSEN.
LOCKING AND RELEASING DEVICE FOR CULTIVATORS.
APPLICATION FILED DEC. 17, 1913.
1,111,920.
Patented Sept. 29, 1914.
2 SHEETS—SHEET 2.
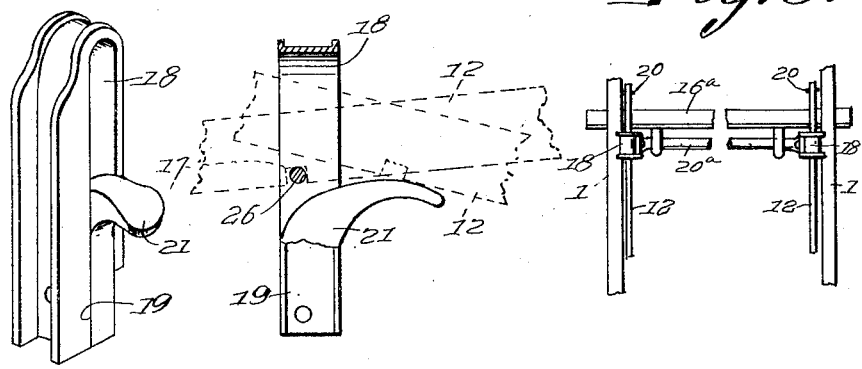
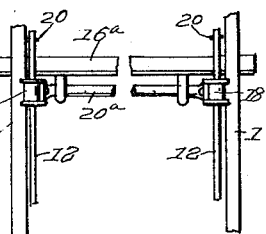
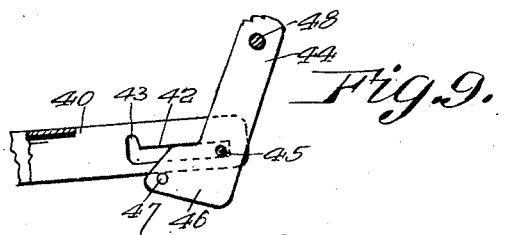
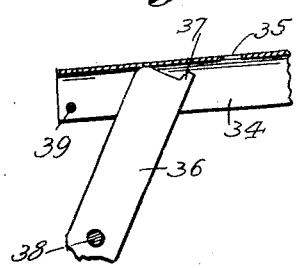
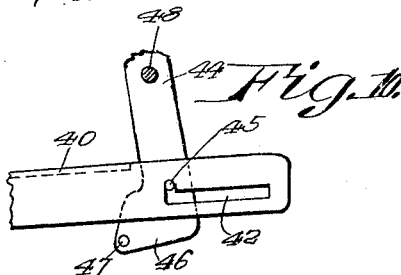
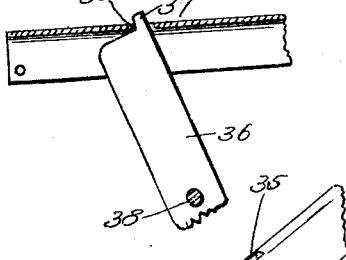
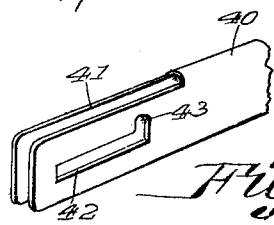
Witnesses
R. R. Bond
E. R. Bond
Inventor,
Henry Petersen,
By E. H. Bond
Attorney

UNITED STATES PATENT OFFICE.

HENRY PETERSEN, OF MOUNT AUBURN, IOWA.

LOCKING AND RELEASING DEVICE FOR CULTIVATORS.

1,111,920.  Specification of Letters Patent.  Patented Sept. 29, 1914.

Application filed December 17, 1913. Serial No. 807,161.

*To all whom it may concern:*

Be it known that I, HENRY PETERSEN, a citizen of the United States of America, and resident of Mount Auburn, county of Benton, and State of Iowa, have invented certain new and useful Improvements in Locking and Releasing Devices for Cultivators, of which the following is a specification.

This invention relates to certain new and useful improvements in locking and releasing devices for the mast of a cultivator, and it has for its objects among others to provide a simple and efficient locking and releasing device that can be readily attached or applied to mast-cultivators.

I employ a mast-moving bar which is pivotally connected with the mast at one end and at its other end movable with relation to a substantially vertical member, which latter is pivotally connected with the lifting lever which raises and lowers the gang frame. It is at the point where this mast-moving bar and the vertical member intersect that I provide my improved lock and release device, which embodies a male and a female member arranged for coöperation in such a manner that when the gang frame is raised the parts so interlock automatically as to hold the parts securely in such raised position. When the gang frame is lowered, the parts move together and the said members are not disengaged until the mast reaches a point just to the rear of the vertical, when a member, a cam, or toe, or the like, is brought into such position as to automatically cause the raising of the one member with relation to the other so as to release the same from their interlocking engagement and the mast-moving bar is free to move without affecting the said vertical member.

Other objects and advantages of the invention will hereinafter appear and the novel features thereof will be particularly pointed out in the appended claims.

The invention is capable of embodiment in a variety of forms, some of which are herein illustrated, and the construction is such that the locking members may be employed in an inverted or reversed position, if desired.

The invention is clearly illustrated in the accompanying drawings, which, with the numerals of reference marked thereon, form a part of this specification, and in which—

Figure 1:
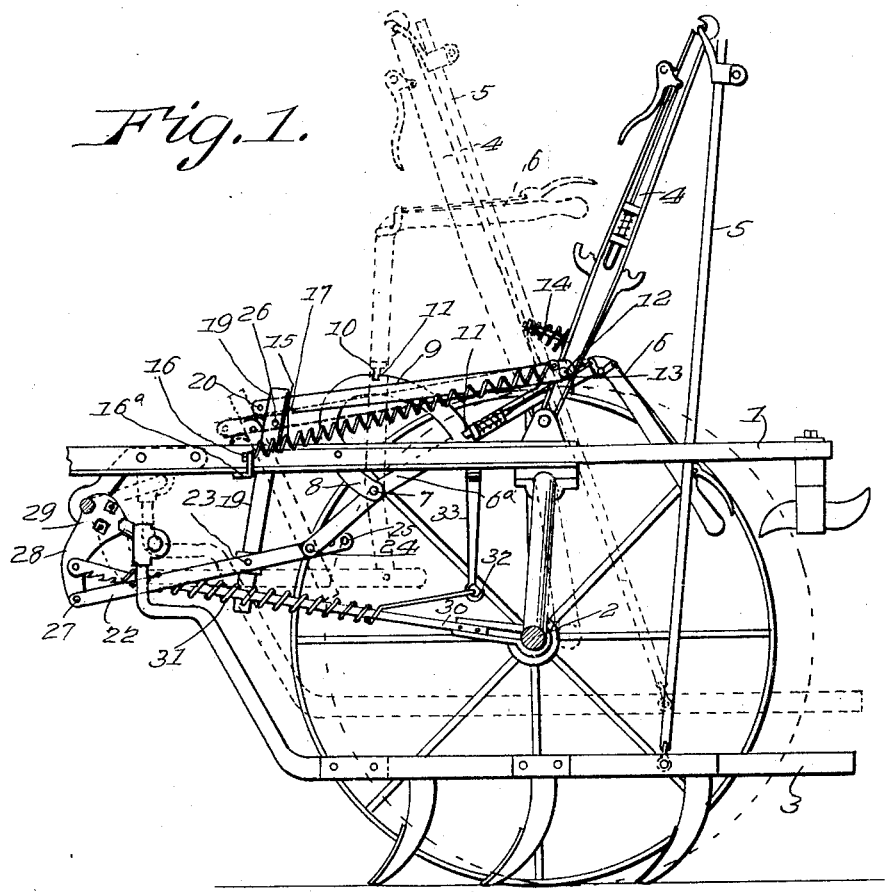
Figure 2:
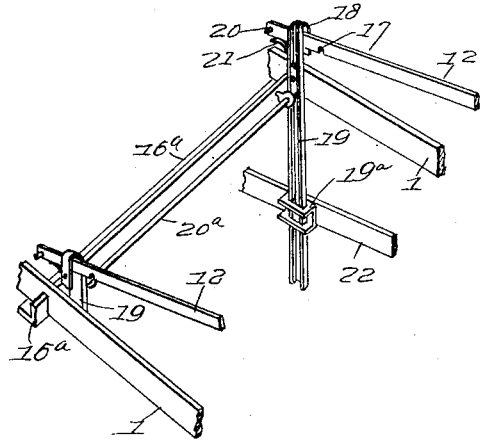

Figure 1 is a side elevation of a portion of the cultivator with my present improvements applied thereto. Fig. 2 is a perspective detail of parts constituting the locking and releasing device. Fig. 3 is an enlarged perspective detail of one portion of the locking and releasing mechanism. Fig. 4 is a view, partly in section, with portions broken away, illustrating the two members of the locking and releasing device. Fig. 5 is a detail in plan with portions broken away. Fig. 6 is a view, partly in longitudinal section and partly in elevation, showing a modified form of locking device with the parts disengaged. Fig. 7 is a similar view showing the parts in interlocked position. Fig. 8 is a perspective detail, with a portion broken away, of the female portion of the lock. Fig. 9 is a detail in elevation with a portion broken away and a part in section, showing another form of lock. Fig. 10 is a similar view showing the parts in their locked position. Fig. 11 is a perspective detail, with a portion broken away, of the female portion of the lock shown in Figs. 9 and 10.

Like numerals of reference indicate like parts throughout the different views.

Referring to the drawings, 1 designates the frame of the cultivator, 2 the arched axle, 3 the gang frame, 4 the mast, 5 the pendulum bar connecting said mast and gang frame, 6 the lifting lever fulcrumed at 7 on a depending portion 8 of the segment 9, said lever being provided with a spring actuated pawl 10 adapted to engage notches 11 in said segment 9, as indicated by full and dotted lines in Fig. 1. These parts, as well as other parts of the cultivator, may be of any well known form of construction and mode of operation, my present invention being applicable to not only the form herein shown but to any and all forms in which a mast and pendulum bar with a rock shaft, a counterbalancing axle and a connection between the axle and an arm on the rock shaft are employed.

In the present construction a bar 12 is pivotally connected at one end to the mast, as at 13, said bar extending substantially parallel with the frame 1, being slightly inclined downwardly and forwardly, as seen in Fig. 1, and to the rear end of this bar at a point slightly above its fulcrum there is attached, as at 14, one end of a spring 15, the other end of which is attached at 16, in any suitable manner, to some fixed part of the frame as the transverse L-bar 16ª, as seen in Fig. 1. The other end of this bar 12 is provided with a notch 17, as seen in Figs. 1 and 4. This end of the bar 12 is adapted to slide through a slot 18 in the upper end of the vertical bar 19, as seen in Figs. 1 and 4, said bar 19, as seen in Fig. 3, being practically formed at the upper end with a bifurcation, the end of the bar 12 being provided with a lateral pin or projection 20 which serves to prevent its being entirely withdrawn from its slot, as will be understood upon reference to Fig. 1. The lower end of the slot or bifurcation 18 is closed by a cam or toe 21 which projects laterally beyond the face of said bar, as seen in Figs. 3 and 4, for a purpose which will soon be made clear.

The bar 19 is pivotally connected, as at 23, with the bar 22 and the latter is pivotally connected, as at 24, with the forward end of the downwardly extended angular member 6ª of the lifting lever, as seen in Fig. 1. This rear end of the bar 22 may be provided with a plurality of openings 25, as seen in Fig. 1, to provide for adjustment of the connection between said bar 22 and the angular member 6ª of the lifting lever when occasion may require. The bar 19 is mounted to freely slide in a yoke or the like 19ª, carried by the bar 22, as seen clearly in Fig. 2, so that the bar 19 has, in addition to its pivotal movement, freedom of endwise movement within certain limits in said yoke.

20ª is a rod extending parallel with the L-bar 16ª and serving to connect the two bars 19 so that they may be operated simultaneously, if desired. This construction is shown clearly in Fig. 2, but is not absolutely required.

Extending transversely of the slot or bifurcation 18 of the bar 19 is a pin 26, as seen best in Fig. 4, for coöperation with the notch 17 of the bar 12. The forward end of the bar 22 is pivotally connected, as at 27, with the arm 28 movable with the rock shaft 29, which latter is connected with the axle 2 by means of the rod 30, a spring 31 being employed, as seen in Fig. 1, the rear end of which is connected with the hook 32 on the arm 33 depending from the main frame 1.

When the gang frame is down, in the position indicated by full lines in Fig. 1, with the mast 4 in its rearward position, as indicated by full lines, and the lever 6 in its rearward position, as also shown by full lines, the bar 12 is also in its rearward position and the notch 17 is out of engagement with its coöperating pin 26; the bar 19 and the member 22 being in the positions indicated by full lines in said Fig. 1. When the lever 6 is moved into the position indicated by dotted lines in Fig. 1, the supporting wheels are thrown to the rear, the crank axle 2 being thrown into the rearwardly inclined position indicated by dotted lines, and the gang frame 3 is elevated into the position in which it is seen in dotted lines in said Fig. 1, the rock shaft 29 and the bars 22 and 19 also being moved rearward to the position indicated by dotted lines. The bar 12 is thrown forwardly until its notch 17 engages over the transverse pin 26, when the spring 15 exerts its influence to hold the parts in such locked position. When the lever 6 is moved from its dotted line position in Fig. 1 toward its full line position in said figure, the mast and pendulum bar are moved rearward, and as soon as the mast reaches a perpendicular position, further movement of the mast and lever to the rear causes the toe or cam 21 to elevate the forward end of the bar 12 so that the same is raised sufficiently to disengage the notch 17 from the pin 26, when the said bar 12 rides freely upon the toe or cam 21, as indicated by the inclined or dotted lines in Fig. 4.

It will be evident that the parts hereinbefore described as constituting the locking and releasing mechanism will work equally as well in an inverted position, that is with the male and female portions disposed beneath the main frame instead of above, the operation, of course, being the reverse.

In Figs. 6 to 11 are shown two other forms of embodiment of the invention, both of which operate in substantially the same manner.

In Figs. 6, 7 and 8, 34 is a member the equivalent of the bar 12, the same being in the form of a member U-shaped in cross section with a slot or opening 35 in the bend thereof and 36 being a member the equivalent of the bar 19 and having at its free end a projection 37 adapted for coöperation with said slot or opening 35 to hold the parts in locked position. The member 36 is designed to be pivotally connected with the bar 22, as at 38, and a cross pin 39 held in the end of the U-shaped member 34 is employed in lieu of the cam or toe 21 in the form shown in Figs. 1, 2, 3 and 4.

In Figs. 9, 10 and 11 there is shown a form of the invention in which 40 represents a member U-shaped in cross section having at one end the open-ended slot 41 in the bend of said member and in the side walls thereof the longitudinal slot 42 terminating at the inner end of the right-angled slot 43. The member 44 constituting the other portion of the lock has a pin 45 projecting therefrom adapted to ride in the slots 42 and to engage in the right-angled portion 43 when the parts are in locked position. The portion 46 of the member 44 which projects through and beyond the lower edge of the member 40 is provided with a transverse pin 47 which serves the same purpose as the cam or toe 21 in Figs. 1, 2, 3 and 4.

It will be noted from the above that all of the forms hereinbefore described operate in substantially the same manner. When the lever is moved to the rear, the male portion of the lock is automatically moved so as to disengage the two interengaging members or portions and when the lever 6 is moved forward, the parts are brought into interlocking engagement where they are firmly held until the lever is moved into the opposite direction. The upper end of the member 44 is designed to be mounted upon a pivot 48, as shown.

The different forms of lock hereinbefore described can be used equally as well upon that class of cultivators in which the mast is so pivoted as to extend below the main frame, the operation being the same and the various forms of locks capable of use either in the relative positions in which they are herein shown, or in their inverted positions, as will be readily understood.

Modifications in details may be resorted to without departing from the spirit of the invention or sacrificing any of its advantages.

What is claimed as new is:—

1. In a cultivator, a mast-moving bar, means for moving the same embodying a lifting lever, and an automatic lock and releasing device therefor operable when the lifting lever is raised or depressed, said device embodying slidably engaged members automatically releasable when the mast is moved to its rear position.

2. A cultivator mast, a mast-moving bar pivotally connected thereto, a lifting lever, a member connected therewith, and interengaging slidable members for automatically locking said mast in its forward position and automatically releasable in the opposite direction.

3. A cultivator mast, a mast-moving bar pivotally connected thereto, a lifting lever, a member connected therewith, interengaging slidable members for automatically locking said mast in its forward position, and automatic releasing means operative as the mast is moved to its rearward position.

4. In a cultivator, a device for the purpose described, comprising members movable with relation to each other, interengaging slidable means for locking said members, and a member for automatically moving one of the interengaging members out of operative relation with the other and a lifting lever.

5. In a cultivator, a device of the class described, comprising a movably mounted mast, a member pivotally connected therewith, a member coöperating with said member, said members having interengaging members, a lifting lever and an automatic releasing device for said interengaging members embodying slidably engaged elements.

6. In a cultivator, a device of the class described, comprising a movably mounted mast, a member pivotally connected therewith, a member coöperating with said member, said members being slidably engaged and having interengaging members, an automatic releasing device for said interengaging members, a lifting lever and a spring connected with one of said members for holding the parts in interengaged relation.

7. In a cultivator, a device of the class described, comprising a movably mounted mast, a member pivotally connected therewith, a member coöperating with said member, said members embodying slidably engaged elements having interengaging members, an automatic releasing device for said interengaging members, a lifting lever and means for preventing separation of said interengaging members.

8. In a cultivator, a device of the class described, comprising a movably mounted mast, a member pivotally connected therewith, a member coöperating with said member, said members embodying slidably engaged elements having interengaging members, an automatic releasing device for said interengaging members, a lifting lever, a spring connected with one of said members for holding the parts in interengaged relation, and means for preventing separation of said interengaging members.

9. In a cultivator, a device for the purpose described, comprising two members having sliding engagement with each other, interlocking means on said members, and means carried by one of said members for moving the other member into disengaged position and allowing of freedom of movement thereof and a lifting lever.

10. In a cultivator, a device for the purpose described, comprising two members having sliding engagement with each other, interlocking means on said members, a lifting lever, means carried by one of said members for moving the other member into disengaged position and allowing freedom of movement thereof, and a spring for holding said members in interlocked engagement.

11. In a device of the class described, a movably mounted mast, a lifting lever, coöperating male and female members one of which is connected to said mast and the other to the lifting lever, and a spring connected to one of said members to assist in moving the mast and in holding said members in interlocked engagement.

12. In a device of the class described, a movably mounted mast, a lifting lever, coöperating interlocking male and female members one of which is connected to said mast and the other to the lifting lever, and a spring connected to one of said members to assist in moving the mast and in holding said members in interlocked engagement.

13. In a device of the class described, a movably mounted mast, a lifting lever, coöperating male and female members one of which is connected to said mast and the other to the lifting lever, and a spring connected to one of said members above the point of attachment of the latter to the mast.

Signed by me at Washington, D. C., this 17th day of December, 1913.

HENRY PETERSEN.

Witnesses:
 E. H. BOND,
 JULIEN E. MATTERN.

---

Copies of this patent may be obtained for five cents each, by addressing the "Commissioner of Patents, Washington, D. C."